Figure 1:
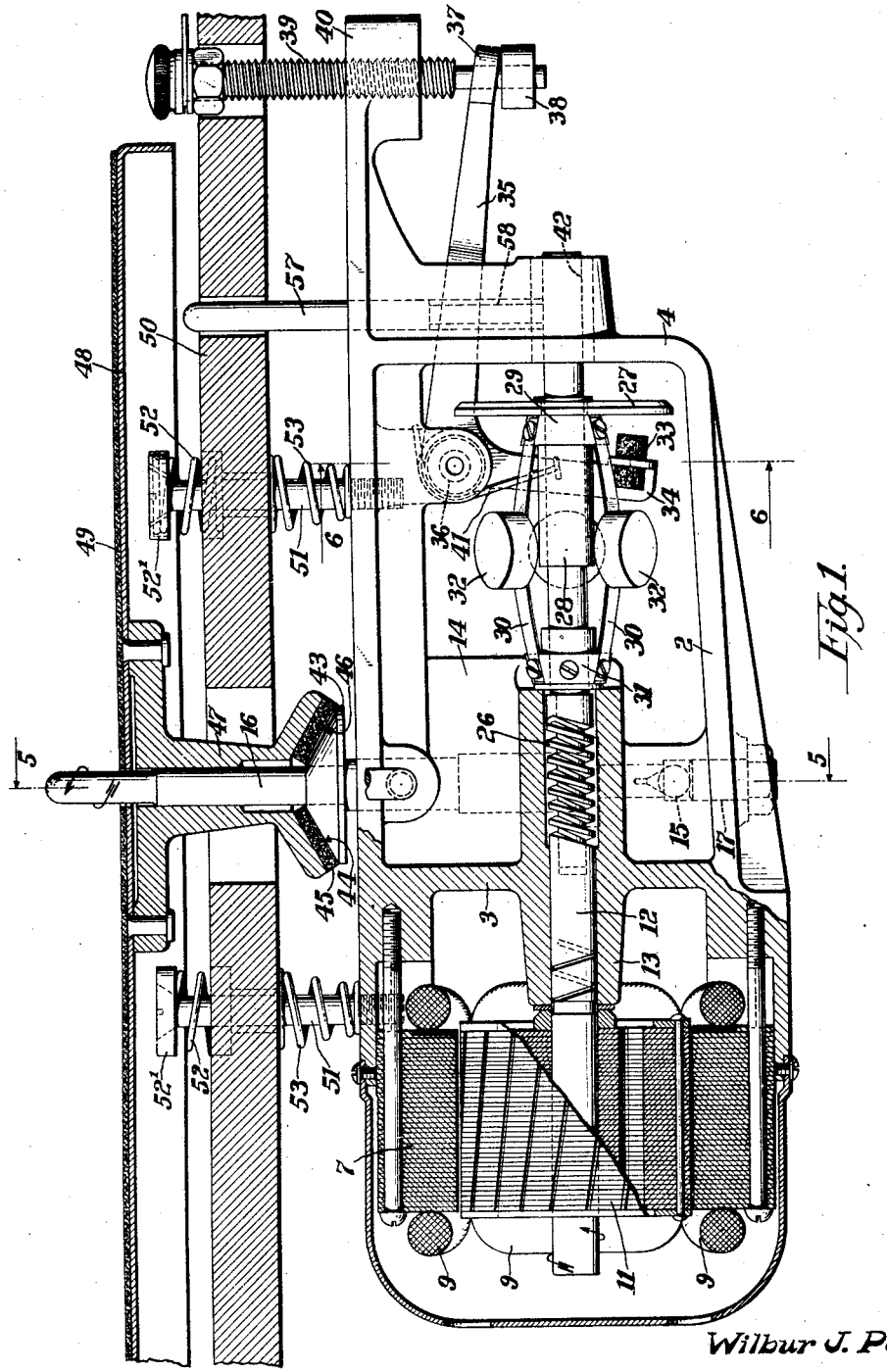

Dec. 22, 1931.  W. J. PEETS  1,838,060
PHONOGRAPH TURNTABLE MECHANISM
Filed Aug. 9, 1929   3 Sheets-Sheet 1

Inventor
Wilbur J. Peets.

Witness:
John H. Cave

By Henry J. Miller
Attorney

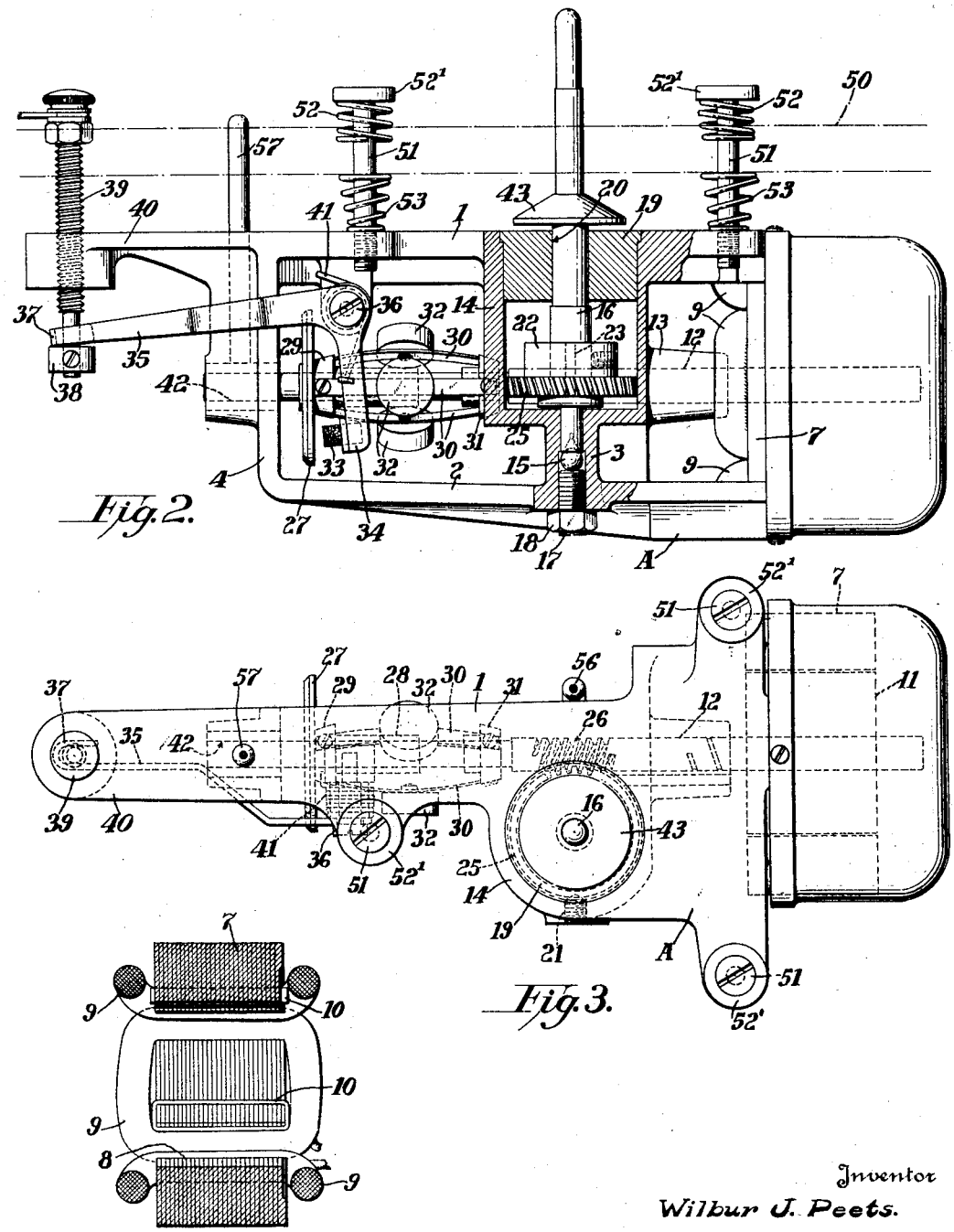

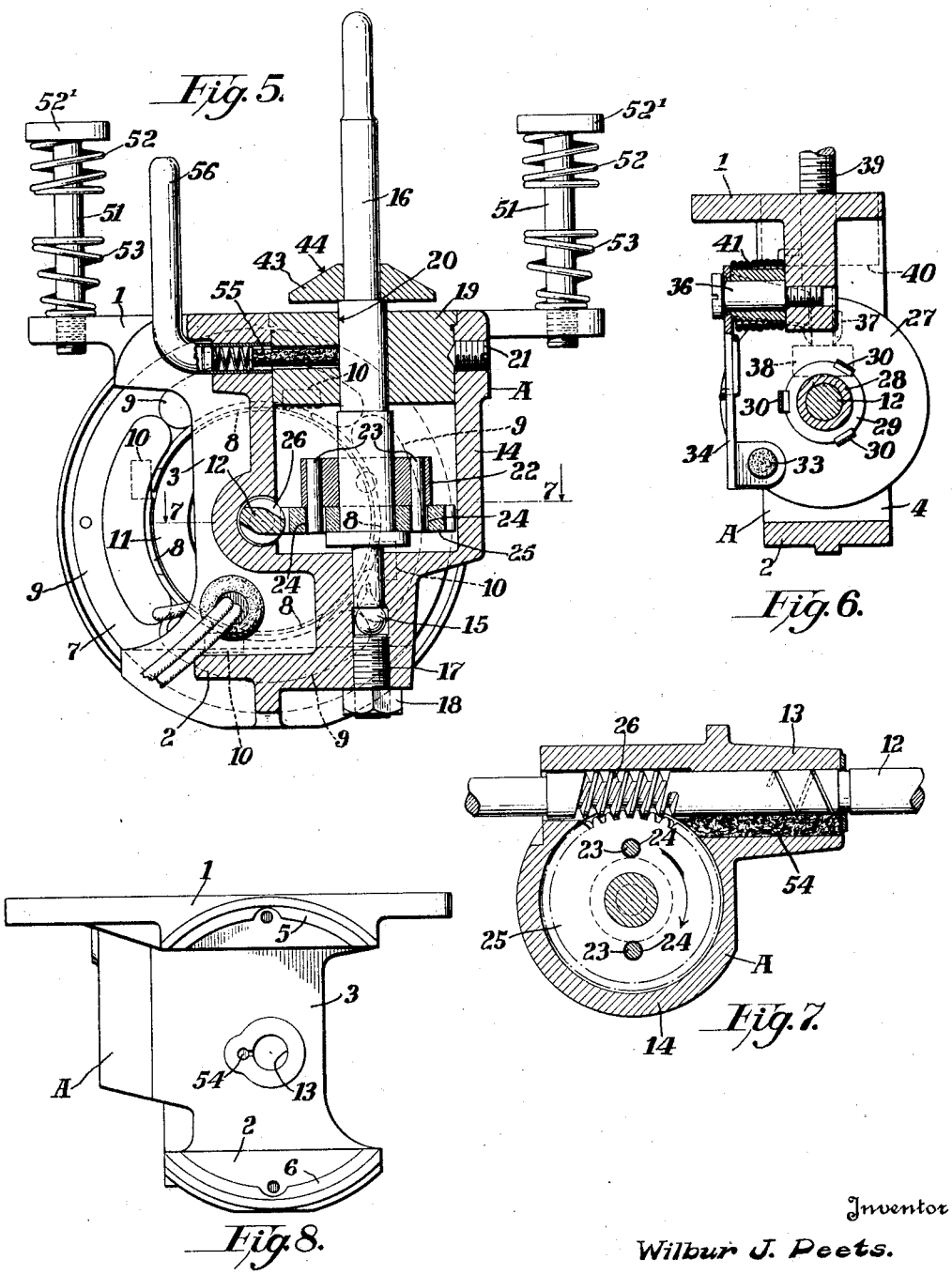

Patented Dec. 22, 1931

1,838,060

UNITED STATES PATENT OFFICE

WILBUR J. PEETS, OF ELIZABETH, NEW JERSEY, ASSIGNOR TO DIEHL MANUFACTURING COMPANY, OF ELIZABETH, NEW JERSEY, A CORPORATION OF NEW JERSEY

PHONOGRAPH TURNTABLE MECHANISM

Application filed August 9, 1929. Serial No. 384,524.

This invention relates to phonographs of the disk-record type and more particularly to the mechanism for supporting and driving the turntable which carries the disk-record. It has for an object to provide an electrically driven turntable mechanism of simple, inexpensive and compact construction which will drive the turntable at a constant though controllable speed and which will not cause radio interference or introduce extraneous electrical or mechanical noises to the pick-up of the sound reproducing system.

To the attainment of the ends in view there is provided a frame-support with cushioning means for mounting it below the usual top-board of a phonograph cabinet or case. Journaled in this frame-support is the turntable-shaft at an angle and to one side of which is journaled an elongated motor-shaft carrying the rotor of an alternating current motor and a centrifugal speed-regulator of the friction-brake type. A single pair of speed-reduction gears connect the two shafts in driving relation. A feature of the invention is the relative arrangement lengthwise of the motor-shaft, of the rotating element of the motor, the shaft bearings, the worm-drive and the speed-regulator; the rotor being disposed at one end of the shaft, the main motor-shaft bearing being next and close to the rotor, the worm-drive being next and close to the main motor bearing; the speed-regulator being next, and a steadying bearing for the motor-shaft being disposed at the extreme end of such shaft remote from the rotor. This relative arrangement of parts makes for a compact and sturdy construction which minimizes vibration and is well adapted for installation as a turntable support and driving device for phonograph records.

It is preferred to employ a shaded pole squirrel-cage induction motor eliminating the need for cut-outs and automatic switches, and also eliminating all interference caused by commutation in motors of the type employing the conventional wound armature with its commutator and brushes.

The gear ratio is so chosen that the turntable shaft may be driven at the standard speed of 78 R. P. M. by a motor-speed sufficiently below synchronous speed to compensate for the slowing up of the motor caused by friction of the working parts including that introduced by the centrifugal speed-governor.

It is also preferred to form the frame-support for the mechanism as a casting with a lubricant housing for the gears and a motor-shaft bearing intersecting such housing and disposed between the rotor of the motor and the centrifugal speed-regulator; the motor-shaft being supported entirely at one end of the motor, the stator of which is received in a seat at one end of the frame-casting.

In the accompanying drawings Fig. 1 is a side elevation, partly in section, of a phonograph-record turntable mechanism embodying the invention. Fig. 2 is a reverse side elevation of the mechanism. Fig. 3 is a top plan view of the mechanism. Fig. 4 is a view of one of the pole-faces of the driving motor. Fig. 5 is a section on the line 5—5, Fig. 1. Fig. 6 is a section on the line 6—6, Fig. 1. Fig. 7 is a section on the line 7—7, Fig 5, and Fig 8 is a motor-end view of the frame support with the motor removed.

According to the preferred embodiment of the invention ilustrated, the device comprises a supporting frame A formed as a casting and including an upper horizontal portion 1 and a lower horizontal portion 2 connected by spaced vertical portions 3 and 4. Secured to the arcuate seats 5, 6 in the frame-portions 1, 2 at one end of the frame is the cylindrical stator-frame 7 of an ordinary induction motor having four poles 8 embraced by the field-coils 9; the poles being shaded to give starting torque by the usual short-circuited copper bands 10 which embrace a portion of each pole face, as shown in Fig. 4. The field-coils 9 are connected in series relation for energization by the usual 60-cycle alternating current supply; the motor thus having a synchronous speed of 1800 R. P. M.

Embraced within the stator-frame 7 is an ordinary squirrel-cage rotor 11 mounted on one end of the motor-shaft 12 which is journaled horizontally in the main bearing 13 formed in the vertical portion 3 of the supporting frame and disposed in juxtaposition to the rotor 11.

Cast integral with the horizontal and vertical portions 1 and 3 of the frame is the gear-housing 14 in the closed bottom of which is mounted the ball step-bearing 15 for the vertically disposed turntable-shaft 16 which is disposed at one side of and in non-intersecting relation with the motor-shaft 12. The bearing ball 15 is supported by the vertical adjusting screw 17 threaded into the bottom of the gear-housing 14 and locked in adjusted position by the nut 18. The main bearing 13 opens into the cavity of the gear-housing 14, as shown in Figs. 5 and 7. The gear-housing 14 is closed at its upper end by the removable plug 19 formed with a bearing 20 for the turntable-shaft 16; the plug 19 being secured in position by the set-screw 21.

Fixed to the shaft 16 within the housing 14 is a disk 22 carrying two diametrically opposed pins 23 which loosely enter the somewhat larger apertures 24 in the gear 25 meshing with the worm 26 cut in the motor-shaft 12 adjacent the main bearing 13; the ratio of gearing being about 18 to 1, requiring a motor-speed of about 1400 R. P. M. for the standard turntable speed of 78 R. P. M. The gear 25 is made of a suitable material having cushioning properties, minimizing the production of gear noise or vibration and the transmission of such noise or vibration to the turntable-shaft 16. Fibrous material, such as canvas, impregnated with a phenolic condensation product or artificial resin, is found to have suitable wear-resisting and cushioning properties. The slight amount of lost motion between the gear 25 and the shaft 16 gives free play for the cushioning properties of the gear.

Slidably mounted on the motor-shaft 12, next to the worm 26, and farther along the shaft 12 from the rotor 11 than the worm 26, is the centrifugally controlled speed-regulating disk 27 having a long tubular hub 28 formed adjacent the disk with a collar 29 to which is secured one end of each of the three bow-springs 30; the other end of each of which springs is secured to the collar 31 fixed to the shaft 12. Riveted to the center of each spring 30 is a weight 32.

When the motor is started and gathers speed, the weights 32 bow the springs 30 outwardly and draw the disk 27 along the shaft 12 into frictional working engagement with the oil-soaked felt brake-shoe 33 carried by the downwardly extending arm 34 of the bell-crank lever 34, 35 fulcrumed at 36 on the frame-member 1; the axis of the fulcrum-screw 36 being transverse to both the motor-shaft 12 and turntable-shaft 16. The other arm 35 of the bell-crank lever extends lengthwise of and beyond the end of the motor-shaft where its return bent end 37 rests upon the collar 38 fixed to the lower end of the speed-regulating screw 39 carried by the extension 40 of the frame-member 1. The spring 41 yieldingly maintains the bell-crank lever-arm 35 in engagement with the collar 38. It will be understood that the working speed of the motor is governed by the position of adjustment of the stationary brake-shoe 33, which produces a drag upon the motor-shaft sufficient to pull the speed of the turntable-shaft down to the desired value.

A speed-regulator of the type described, while quite satisfactory as to its speed-governing characteristics, is difficult to balance so closely that it will not vibrate its supporting shaft. To steady the shaft 12 for the support of the speed-governor, there is provided at the end of such shaft remote from the motor, a bearing 42 which, together with the main bearing, supports the motor-shaft at both ends of the speed-governor and makes for quiet running and smooth operation. It will be observed that the speed governing and adjusting mechanism is carried in its entirety by the supporting frame A.

Fixed to the turntable shaft 16 above the frame-member 1 is a turntable supporting collar 43 having a conical upper face 44 upon which a felt washer 45 is pressed by the mating conical surface 46 at the lower end of the hub 47 of the turntable 48 which supports the phonograph record 49. The felt washer 45 and mating conical faces 44, 46, constitute a friction-clutch having a sufficient grip to drive the record 49 under the usual pick-up needle (not shown). This friction-clutch prevents the gears from being damaged in case the turntable is forceably turned by hand or held from turning by a careless operator. It also prevents the transmission of motor noise or vibration to the turntable.

The entire device is suspended from the usual top-board 50 of the cabinet or carrying case by means of three screws 51 which are tapped into the frame-member 1. Top cushioning springs 52 are interposed between the board 50 and the screw-head washers 52', and bottom cushioning springs 53 are interposed between the board 50 and the frame-member 1. These cushioning springs absorb any remanent vibration and prevent the transmission of hum or vibration to the supporting cabinet or carrying case.

Lubrication of the gears 25, 26 and the lower bearing for the shaft 16 is taken care of by packing the gear-housing 14 with a suitable grease. A felt-packed duct 54, Fig. 7, along the bearing 13, lubricates the latter from the lubricant supply in the housing 14. The top-bearing 20 for the shaft 16 is lubricated through the wick 55 leading from the oil-tube 56. A similar oil-tube 57 and wick 58 are provided for lubrication of the end-bearing 42.

The shaft-aperture in the bearing 13 is preferably slightly enlarged at 13' where it embraces the worm 26; the enlargement being insufficient to permit escape of the grease used as a gear lubricant. The gears, being totally enclosed, will run for a long time in clean grease, free from grit and dirt.

Having thus set forth the nature of the invention, what I claim herein is:—

1. In phonograph apparatus, a one-piece skeleton frame having an annular motor seat in one end of the same, shaft bearings extending from said motor seat and an upright grease well open to one of said shaft bearings, a motor having an annular portion secured to said end motor seat and having a shaft journalled in the bearings, a worm on the motor shaft exposed to the well, a vertical spindle journalled in the well and a worm gear on said spindle engaging the worm on the motor shaft.

2. In phonograph apparatus, a one-piece skeleton frame having a motor seat in one end, shaft bearings extending from said motor seat and an upright grease well open to one of said shaft bearings, a motor mounted in the motor seat and having a shaft journalled in the bearings, a worm on the motor shaft exposed to the well, a vertical spindle journalled in the well, a worm gear on said spindle engaging the worm on the motor shaft, said spindle being journalled at the top in a plug removably seated in and closing the upper end of the well.

3. In phonograph apparatus, a supporting frame having a motor seat at one end, a long shaft bearing adjacent said seat and a second aligned shaft bearing, spaced from said long shaft bearing, a motor of the induction type having a stator mounted on said motor seat and having a rotor with a long shaft extending through the long bearing and into the other bearing, said rotor being mounted on one end of said shaft and thereby supported entirely at one side of the same, a governor on the extended portion of the motor shaft between the bearings and a turn-table spindle driven through speed reduction gearing from said motor shaft, said governor comprising relatively fixed and slidable elements on the shaft and said fixed element being positioned adjacent the end of the long bearing to serve as a thrust shoulder securing the rotor shaft in position.

4. An electric phonograph drive unit, comprising a supporting frame having a motor seat in one end of the same and provided with a long motor shaft bearing adjacent said seat and a second motor shaft bearing spaced from said first bearing, a motor mounted on said seat and having a long shaft extending through the long bearing to the second bearing aforesaid, a governor on said shaft between the bearings and including a collar fixed on the shaft at the end of the long bearing to act as a thrust shoulder against the end of the long bearing and a sleeve slidable on the shaft and connected with the collar by governor springs, a vertical spindle journalled on the frame and driving gearing between the motor shaft and spindle.

5. In combination, phonograph apparatus, comprising a frame having a vertical grease well with a shaft bearing open through one side of the same, a vertical spindle journalled in said well, a worm gear on the lower end of said spindle in line with the open portion of said shaft bearing and a shaft journalled in said bearing and having a worm portion at the open part of said bearing engaging the worm gear on the spindle, said bearing having thrust shoulders at opposite ends of the same and thrust members on the shaft opposed to said thrust shoulders, one of said thrust shoulders being provided by a rotor fixed on the shaft and the other thrust member by a collar adjustably and releasably held secured on the shaft.

6. In a phonograph apparatus, the combination with a unitary frame structure having a vertical grease well provided with a long shaft bearing at one side of the same, said long shaft bearing between the ends of the same being open to the interior of the grease well, a motor seat on one end of the frame adjacent one end of the long shaft bearing, a motor stator mounted on said motor seat, a rotor having a supporting shaft extending through the long shaft bearing, said shaft having a shoulder in thrust relation to the adjacent end of the long shaft bearing, said shaft carrying a gear portion in line with the part of the shaft bearing which is open to the well and said shaft projecting from said gear portion beyond the other end of the long shaft bearing, a governor on said projecting portion of the shaft and comprising fixed and slidable elements, said fixed element being secured on the projecting portion of the shaft in position for thrust relation with said opposite end of the long bearing and a spindle journalled in the grease well and carrying a gear in cooperative relation to the gear portion of the shaft.

7. In phonograph apparatus, the combination with a unitary frame structure having a vertical grease well provided with a long shaft bearing at one side of the same, said long shaft bearing between the ends of the same being open to the interior of the grease well, a motor seat on one end of the frame adjacent one end of the long shaft bearing, a motor stator mounted on said motor seat, a rotor having a supporting shaft extending through the long shaft bearing, said shaft having a shoulder in thrust relation to the adjacent end of the long shaft bearing, said shaft carrying a gear portion in line with the part of the shaft bearing which is open to the well and said shaft projecting from said gear portion beyond the other end of the long shaft bearing, a governor on said projecting portion of the shaft and comprising fixed and slidable elements, said fixed elements being secured on the projecting portion of the shaft in position for thrust relation with said opposite end of the long bearing, a spindle journalled in the grease well and carrying a gear in cooperative relation to the gear portion of the shaft, said grease well being open at the top to a diameter to receive the gear of the spindle and a cover removably closing the top of the grease well, said cover having a bearing for the spindle, thereby enabling the spindle and gear to be lifted out at the top of the well, on removal of the cover.

8. In phonograph apparatus, a frame having a long shaft bearing, a motor mounted on said frame and including a rotor having a large diameter, rigid shaft portion journalled in said long bearing and supporting said rotor entirely from the one side thereof, said rotor shaft having a smaller diameter portion projecting from the long bearing, governor mechanism on said smaller diameter shaft portion, a worm on the rigid large diameter portion of the shaft, the bearing being open at one side to expose said worm, a spindle journalled to one side of said shaft bearing and a worm gear on the spindle in mesh with the exposed portion of the worm.

9. In phonograph apparatus, a supporting frame, an electric motor having a stator and cooperating rotor, said rotor having a rigid large diameter shaft at one side of the same and having a worm cut in said large diameter shaft portion, the frame having a bearing of a diameter to receive said rigid shaft portion and worm, said bearing being open at one side to expose the worm cut in said shaft portion, a worm gear in mesh with said exposed worm portion of the shaft and a spindle driven by said worm gear.

10. A phonograph-record turntable mechanism comprising a frame-casting formed with an open-topped gear-cavity, a turntable-shaft bearing at the bottom of said gear-cavity, a removable closure for the top of said gear-cavity, said closure being formed with a bearing for a turntable-shaft, a turntable-shaft journaled in said bearings, a gear fixed to said turntable-shaft within said gear-cavity, a motor-shaft bearing opening into the side of said gear-cavity, and a motor-shaft journaled in said motor-shaft bearing and having a worm thereon meshing with said gear.

11. A phonograph-record turntable mechanism comprising a frame support formed with an open-topped cup-shaped gear-cavity, a removable plug closing the top of said cavity, a vertical turntable-shaft passing through said cavity and journaled in the bottom wall of said cavity and in said removable plug, a gear on said shaft within said cavity, a motor-shaft entering one side of said cavity and having a worm thereon meshing with said gear, and motor and speed-governor elements on said shaft at opposite ends of said worm.

12. In phonograph apparatus, a supporting frame having a motor seat at one end, a long shaft bearing adjacent said seat and a second aligned shaft bearing spaced from said long shaft bearing, a motor of the induction type having a stator mounted on said motor seat and having a rotor with a long shaft extending through the long bearing and into the other bearing, said shaft being supported entirely in said two bearings and said rotor being mounted on the shaft at the outer side of said long bearing, said rotor being thereby supported entirely at one side of the same, a governor on the extended portion of the motor shaft between the bearings and a turntable spindle driven through speed reduction gearing from said motor shaft.

13. A phonograph-record turntable mechanism comprising a supporting frame, an electric motor including a stator carried at one end of said supporting frame, a rotor, a rotor shaft, spaced bearings for the rotor-shaft at the same side of the rotor, one of said bearings being closely adjacent the rotor, a worm on the rotor-shaft closely adjacent the last mentioned bearing, a centrifugal speed-regulator element on the rotor-shaft between said bearings, a turntable-shaft journaled vertically in said frame and a gear on said shaft meshing with said worm.

In testimony whereof, I have signed my name to this specification.

WILBUR J. PEETS.